United States Patent
Lee (10) Patent No.: US 8,170,009 B2
(45) Date of Patent: May 1, 2012

(54) METHOD AND APPARATUS FOR RECEIVING BROADCASTING DATA

(75) Inventor: Doh-hyeong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1768 days.

(21) Appl. No.: 11/165,035

(22) Filed: Jun. 24, 2005

(65) Prior Publication Data
US 2006/0002389 A1 Jan. 5, 2006

(30) Foreign Application Priority Data
Jun. 30, 2004 (KR) .................. 10-2004-0050428

(51) Int. Cl.
*H04L 12/28* (2006.01)
*H04L 12/56* (2006.01)
*H04N 7/173* (2011.01)
(52) U.S. Cl. ............ 370/389; 370/392; 370/395.63; 725/116
(58) Field of Classification Search .......... 370/389, 370/392, 395.3, 422, 426, 428, 429, 471, 370/474; 725/38, 100, 104, 131, 135, 136, 725/139, 151
See application file for complete search history.

(56) References Cited

U.S. PATENT DOCUMENTS

| 6,111,611 | A | 8/2000 | Ozkan et al. | |
| 6,215,530 | B1 | 4/2001 | Wasilewski | |
| 7,546,354 | B1* | 6/2009 | Fan et al. | 709/219 |
| 2002/0083470 | A1* | 6/2002 | Lu | 725/136 |
| 2004/0187161 | A1* | 9/2004 | Cao | 725/110 |

FOREIGN PATENT DOCUMENTS

| JP | 09-130764 A | 5/1997 |
| KR | 2001-0036481 A | 5/2001 |

* cited by examiner

*Primary Examiner* — Chirag Shah
*Assistant Examiner* — Srinivasa Reddivalam
(74) *Attorney, Agent, or Firm* — Sughrue Mion, PLLC (57) ABSTRACT

A method and apparatus for receiving digital broadcasting data. The method for receiving digital broadcasting data includes: extracting location information of second service data which already received first service data refers to, from the first service data; by analyzing the location information, determining whether the second service data is in-band service data transmitted through an in-band channel, or out-of-band service data transmitted through an out-of-band channel; and if the second service data is transmitted through an out-of-band channel, determining the location information as the program number of the second service data.

17 Claims, 7 Drawing Sheets

FIG. 1A (PRIOR ART)

| CH | BROADCASTING STATION | TIME | TITLE | SOURCE_ID | PROGRAM_NUMBER |
|---|---|---|---|---|---|
| 10 | MBC | 5:00~6:00 | TROY | 100 | 0001 |
| 11 | KBS | 5:00~6:00 | NEWS | 200 | 0002 |
| 12 | EBS | 5:00~6:00 | HIGH SCHOOL MATHEMATICS | 300 | 0003 |

FIG. 1B (PRIOR ART)

| PMT (TROY) | PMT (NEWS) | PMT (HIGH SCHOOL MATHEMATICS) |
|---|---|---|
| PROGRAM NUMBER = 0001 | PROGRAM NUMBER = 0002 | PROGRAM NUMBER = 0003 |
| STREAM TYPE = VIDEO<br>PID = 0010 | STREAM TYPE = VIDEO<br>PID = 0020 | STREAM TYPE = VIDEO<br>PID = 0030 |
| STREAM TYPE = AUDIO<br>PID = 0011 | STREAM TYPE = AUDIO<br>PID = 0021 | STREAM TYPE = AUDIO<br>PID = 0031 |
| STREAM TYPE = SERVICE<br>CAROUSEL_ID = 1<br>PID = 0012 | STREAM TYPE = SERVICE<br>PID = 0022 | STREAM TYPE = SERVICE<br>PID = 0032 |
| STREAM TYPE = SERVICE<br>CAROUSEL_ID = 2<br>PID = 0013 | | |

| SERVICE_ID | | MEANING |
|---|---|---|
| 1ST BYTE | 2ND AND 3RD BYTE | |
| 00 | 0000 ~ FFFF | SOURCE_ID (INBAND) |
| 01 | 0000 ~ FFFF | ABSTRACT SERVICE DEFINED BY MANUFACTURER |
| 02 | 0000 ~ FFFF | ABSTRACT SERVICE DEFINED BY MSO |
| 03~FF | 0000 ~ FFFF | RESERVED |

FIG. 4B

| SERVICE_ID || MEANING |
|---|---|---|
| 1ST BYTE | 2ND AND 3RD BYTE | |
| 00 | 0000 ~ FFFF | SOURCE_ID (INBAND) |
| 01 | 0000 ~ FFFF | ABSTRACT SERVICE DEFINED BY MANUFACTURER |
| 02 | 0000 ~ FFFF | ABSTRACT SERVICE DEFINED BY MSO |
| 03~FF | 0000 ~ FFFF | PROGRAM NUMBER (OUTOF BAND) |

METHOD AND APPARATUS FOR RECEIVING BROADCASTING DATA

This application claims the priority of Korean Patent Application No. 10-2004-0050428, filed on Jun. 30, 2004, in the Korean Intellectual Property Office, the disclosure of which is incorporated herein in its entirety by reference.

BACKGROUND OF THE INVENTION

1. Field of the Invention

The present invention relates to a method and apparatus for receiving digital broadcasting data, and more particularly, to a method and apparatus for receiving digital broadcasting data which can be applied uniformly to in-band channels and out-of-band channels by defining a new network service access point (NSAP) format.

2. Description of the Related Art

Digital broadcasting has enabled new application fields through digitalization of broadcasting contents. One of these new application fields is multimedia broadcasting.

Multimedia broadcasting is a new concept of broadcasting service which is differentiated from the conventional audio and video broadcasting using analog, or digital signals, and radios and TVs. While the services of the conventional broadcasting are limited to only simple transmission of voice and images, multimedia broadcasting provides a variety of new services unimagined by the conventional broadcasting, by transmitting digital data through broadcasting channels.

For example, while KBS, a service provider, broadcasts a movie program, Troy, through a transmission line, KBS can make information on the production process and so on of Troy, be displayed to viewers. Then, when broadcasting the program, Troy, KBS transmits three types of data, including video data, audio data, and service data. A terminal receives the three types of data, then decodes the video and audio data by using a decoder, and reproduces the data. The service data is processed by an application program of the terminal or an application program received through a transmission line, and then the processed result is output through display apparatus to a user.

Figure 1A:
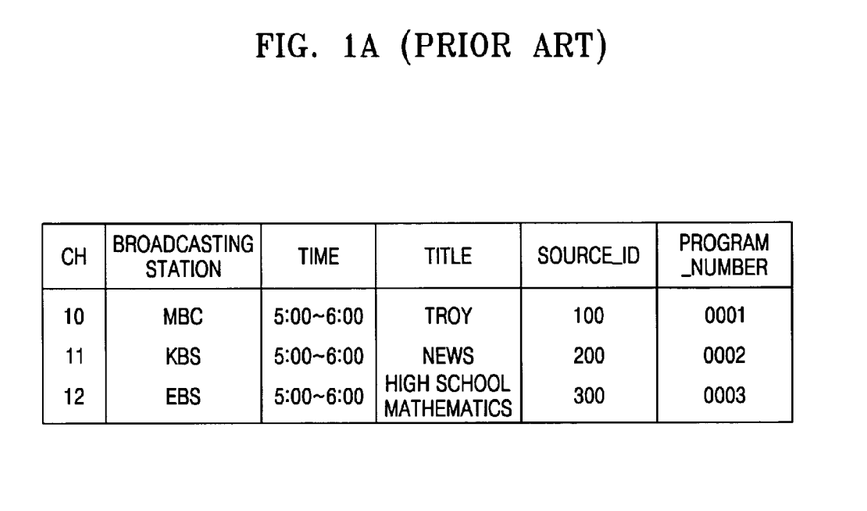
FIGS. 1A and 1B are diagrams showing a service information table (SIT) and a program mapping table (PMT), respectively.
Figure 1B:
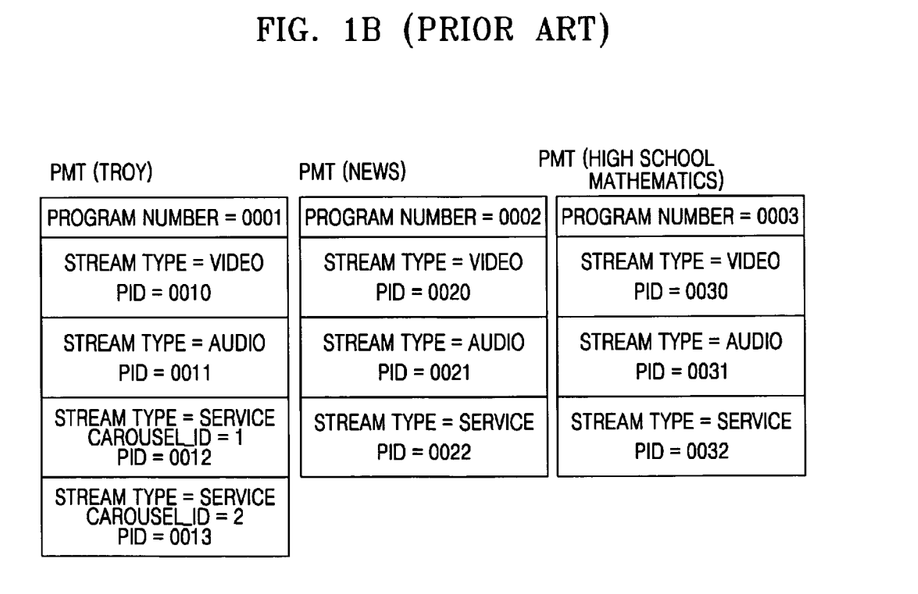

FIGS. 1A and 1B are diagrams showing a service information table (SIT) and a program mapping table (PMT), respectively.

The three types of data transmitted in digital broadcasting are processed in the form of files and data streams. When files are transmitted, all files are divided into packets of a predetermined length. By the nature of broadcasting, packets are repeatedly transmitted and a set of repeated packets is referred to as a carousel. Information on the relation between a packet and a program is transmitted through a separate process from the service provider to a terminal. This information is expressed, for example, as a service information table (SIT), a program mapping table (PMT), and so on. The SIT maps source ID and program number. The source ID is an identifier of a broadcasting provider, and a program number that is an identifier of a broadcast program (FIG. 1A), and the PMT maps a program number and a packet ID (FIG. 1B). The packet ID is an identifier for identifying a packet indicating video data, audio data, and service data included in one program. Based on the packet ID, a terminal obtains a packet corresponding to a program that it requires, from a transmission channel.

Service data is generated by the service provider, and then broadcast to terminals. Service data can be an application program or application data that is referred to by an application program. Hereinafter, in order to distinguish these, the former will be referred to as a service program, and the latter as service reference data. Service data is obtained by a terminal from a transmission channel and is executed by a processor in the terminal. Generally, services programs are written by using Java, HTML, MHEG, etc.

In a service program, there is a locator or a network service access point (NSAP) including information on the location of reference data that is referred to by each service program. The NSAP is defined by ISO/IEC 8348 and is used as an address to identify a network end point in an OSI networking model.

Meanwhile, digital broadcasting is performed through a transmission channel with a limited bandwidth. The transmission channel is divided into an in-band channel (IB) and an out-of-band channel (OOB) according to the size of a bandwidth of the transmission channel.

The in-band channel is a channel through which main data is broadcast according to predetermined broadcasting standards, and generally has a very large bandwidth, and transmits audio data, video data, and service data all together.

In broadcasting through the in-band channel, each broadcasting station is assigned a source ID that is a unique identifier. In the out-of-band channel, broadcasting standards for data transmission are not determined, and the bandwidth is very narrow such that generally audio and video data are not transmitted and only service data is transmitted. In the out-of-band channel, a source ID is not used.

Figure 1C:
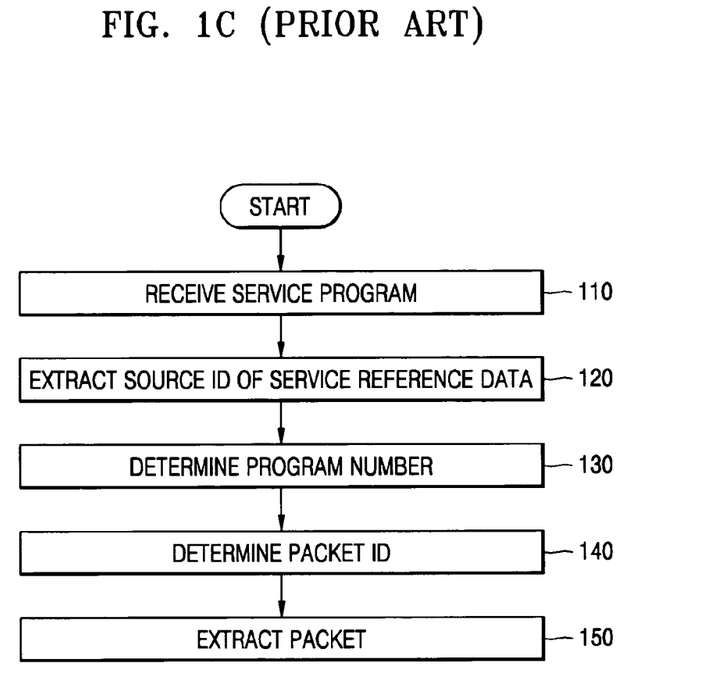
FIG. 1C is a flowchart of the operations performed by a method for receiving data broadcast through an in-band channel.

FIG. 1C is a flowchart of the operations performed by a method for receiving data broadcast through an in-band channel.

In operation 110, a receiver obtains audio data, video data, and service data from a transmission line. If the service data is a service program and it is indicated that this service program should refer to another service data, service reference data should also be received.

In operation 120, by analyzing an NSAP existing in the service program obtained in the operation 110, the receiver extracts the source ID of service reference data which the service program desires to refer to.

In operation 130, based on the service information table (SIT), the receiver determines a program number (PN) corresponding to the source ID. The SIT includes a table mapping a source ID and a program number (PN) and is transmitted from the broadcasting provider to receivers in advance according to predetermined protocols.

In operation 140, the receiver determines a packet ID corresponding to the program number based on the program mapping table (PMT).

In operation 150, by extracting packets having the packet ID among all packets received by the receiver, based on the packet ID, the receiver selectively receives those packets.

Unlike the process of FIG. 1C, in broadcasting through an out-of-band channel, a source ID is not determined. Accordingly, based on a program number, the receiver extracts service reference data desired by the user from a transmission line. The program number is transmitted in advance by the broadcasting provider to the receiver.

At present, as a digital broadcasting standard, Open-Cable™ Application Platform (OCAP) is being prepared, and research activities for this standard currently being performed are to uniformly process service data both in an in-band and an out-of-band channels.

Figure 2:
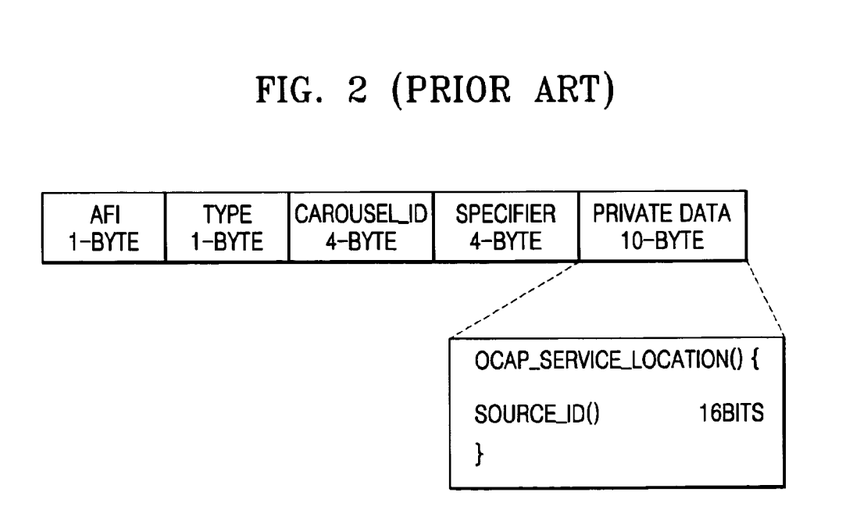
FIG. 2 is a diagram of the structure of a network service access point (NSAP) according to the conventional Open-Cable™ Application Platform (OCAP)

FIG. 2 is a diagram of the structure of an NSAP according to the conventional OCAP.

Referring to FIG. 2, the conventional NSAP is formed with 20 bytes in total. A private data field for a service program is assigned 10 bytes.

Among a variety of information items for a service program included in the private data field, there is a 2-byte source ID. The source ID indicates location information on a network of service reference data which is transmitted. In digital broadcasting, location information of service reference data on a network is identified by using an NSAP and based on this location information, the service reference data is obtained from a transmission line. The service reference data is data required for performing a service program broadcast, and is data or a program.

Which information should be recorded in the location information of reference data varies depending on digital broadcasting standards. In the specifications of the OCAP or advanced common application platform (ACAP), a source ID is recorded in this service ID. A source ID is an identifier for identifying a service provider broadcasting reference data. At present, in the OCAP, the source ID is 2 bytes long, and each service provider of an in-band channel has a proper value.

Details of the OCAP are available in OpenCable™ Application Platform Specification as of Mar. 5, 2004, and in the specification, details of the NSAP can be found at OCAP specification 3.2.1 Definitions 18p Locator, 16.2.1.1. OCAP 1.0 Locator, and 16.2.1.5 Locators and content referencing. These contents are merged into the present invention.

However, the OCAP standard described above defines only the in-band channel and does not have any definitions on the out-of-band channel. Accordingly, the conventional NSAP shown in FIG. 2 cannot appropriately express location information of reference data incoming through an out-of-band channel.

SUMMARY OF THE INVENTION

The present invention provides a method for transmitting and receiving service data in which a network service access point (NSAP) of a new format that can be applied to both an in-band channel and an out-of-band channel is provided and by using this NSAP, the method for transmitting and receiving service data can be applied to both an in-band channel and an out-of-band channel.

According to an exemplary embodiment of the present invention, there is provided a method for receiving digital broadcasting data including: extracting location information of second service data which already received first service data refers to, from the first service data; by analyzing the location information, determining whether the second service data is in-band service data transmitted through an in-band channel, or out-of-band service data transmitted through an out-of-band channel; and if the second service data is transmitted through an out-of-band channel, determining the location information as the program number of the second service data.

The location information may include a service type that is an identifier for identifying whether the second service data is of an in-band or an out-of-band.

When the service type is one type, the location information may include a source identification (ID) of an in-band channel as the location information of the second service data.

When the service type is another type, the location information may include a program number of an out-of-band channel as the location information of the second service data.

According to another aspect of an exemplary embodiment of the present invention, there is provided an apparatus for receiving digital broadcasting data including: a service processing unit which processes first service data already received by the receiving apparatus, and by doing so, generates service output data; a PID determination unit which determines the packet ID of second service data that is referred to by the first service data, based on the location information in the first service data; and a filter unit which by filtering packets received by the apparatus based on the packet ID, receives packets corresponding to the second service data, wherein the location information includes any one of a source ID and a program number of the second service data according to whether the channel through which the second service data is transmitted is an in-band channel or an out-of-band channel.

The PID determination unit may include: an NSAP analysis unit which by analyzing the NSAP, extracts the service type and the service ID; a location information extraction unit which when the service type is one type, determines the service ID as a source ID, and when the service type is another type, determines that the service ID indicates a program number, and by doing so, extracts any one of the source ID and the program number of the second service data, as location information of the second service data; an SIT mapping unit which by using a predetermined service information table (SIT), determines a program number mapped into the source ID; and a PMT mapping unit which determines a packet ID corresponding to any one of a program number extracted from the location information by using a predetermined program mapping table (PMT), and a program number extracted from the SIT mapping unit.

According to still another exemplary embodiment of the present invention, there is provided an apparatus for transmitting first service data when first service data of digital broadcasting refers to second service data transmitted to an out-of-band channel, the apparatus including: a first service generation unit which generates the program code of the first service data including a network service access point (NSAP), and based on the program code of the first service data, generates a first program mapping table; a second service generation unit which generates the program code of the second service data, and based on the program code of the second service data, generates a first program mapping table including the program number of the second service data; an NSAP generation unit which by inserting the program number of the second service data from the second service program into an NSAP of the first service data, generates the NSAP of the first service data; and a transmission unit which transmits the first service data and the first service program mapping table.

According to yet still another exemplary embodiment of the present invention, there is provided a method for transmitting first service data when first service data of digital broadcasting refers to second service data transmitted to an out-of-band channel, the method including: generating the program code of the first service data including a network service access point (NSAP), and based on the program code of the first service data, generating a first program mapping table; generating the program code of the second service data, and based on the program code of the second service data, generating a first program mapping table including the program number of the second service data; by inserting the program number of the second service data from the second service program into an NSAP of the first service data, generating the NSAP of the first service data; and transmitting the first service data and the first service program mapping table.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Exemplary embodiments of the present invention will now be described more fully with reference to the accompanying drawings, in which exemplary embodiments of the invention are shown.

Hereinafter, service data indicates additional data excluding audio/video (AV) data among data transmitted through digital broadcasting.

Also, a service program indicates all types of application program including a program code formed to be executed in a receiver, as one type of service data, and service reference data indicates pure data excluding service programs in service data. Accordingly, when first service data refers to second service data, the first service data can be a service program, and the second service data can be pure data (hereinafter referred to as reference data) or another service program.

Figure 3:
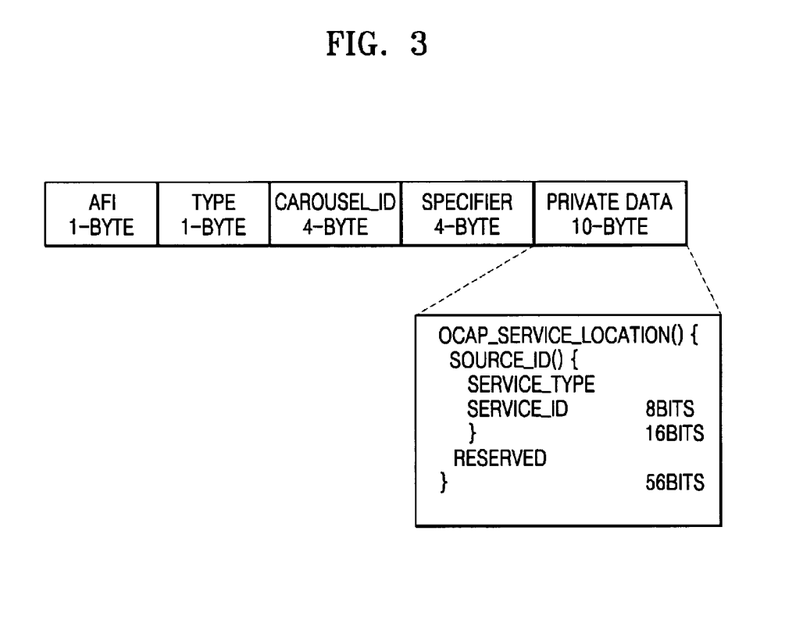
FIG. 3 is a diagram of the structure of an NSAP according to an exemplary embodiment of the present invention.

FIG. 3 is a diagram of the structure of an NSAP according to an exemplary embodiment of the present invention.

The NSAP according to the present invention has a 3-byte source ID area.

According to the NSAP of an exemplary embodiment of the present invention, the first 1 byte of the source ID area indicates a service type, and the remaining 2 byte area indicates a service ID.

Service type service_type indicates whether location information included in a current program code is the location information of reference data transmitted through an in-band channel or an out-of-band channel. For example, if service_type=00, then it indicates an in-band service, or else it indicates an out-of-band service.

Service ID service_ID indicates whether location information included in the current program code is that of a service program transmitted through an in-band channel or an out-of-band channel. In case of the in-band channel, the service ID indicates a source ID of the service program, and in case of the out-of-band channel, the service ID indicates the program number of the service program transmitted through an out-of-band channel.

A new NSAP format introduced in an exemplary embodiment of the present invention can express uniformly location information of programs of in-band and out-of-band channels, by simply increasing the size of the source ID area from 2 bytes to 3 bytes.

Figure 4A:
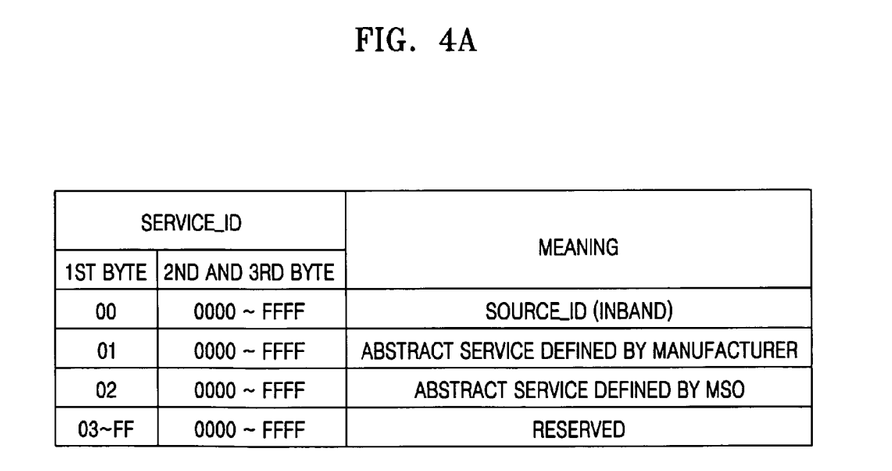
FIG. 4A is a diagram showing the structure of a source ID of FIG. 2 defined in the OCAP specification.
Figure 4B:
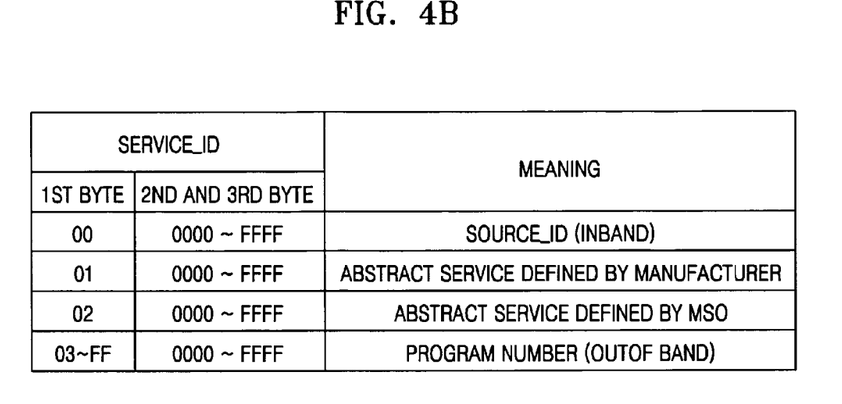
FIG. 4B is a diagram showing a service ID of FIG. 2 newly defined according to an exemplary embodiment of the present invention.

FIG. 4A is a diagram showing the structure of a service ID in an in-band defined in the current OCAP specification, and FIG. 4B is a diagram showing the structure of a service ID newly introduced in an exemplary embodiment of the present invention.

FIG. 4A shows the structure of a source ID of FIG. 2 defined in the OCAP specification.

When the first byte of the source ID is 00, the second and third bytes indicate a source ID. This service ID is only for indicating a source ID of an in-band channel.

When the first byte of the source ID is 01 or 02, it indicates location information of abstract service by a manufacturer, a system operator (SO), or a multiple system operator (MSO). This location information can also be used as location information of a service transmitted through an out-of-band channel. However, in relation to this location information, there is a problem that a program mapping table (PMT) cannot be obtained and the location information is limited to abstract services. In addition, conversion into an NSAP is impossible.

Lastly, when the first byte of the service ID is 03-FF, nothing has been defined yet. In the present embodiment of the present invention, a NSAP for an out-of-band is defined by using this area.

FIG. 4B is a diagram showing a service ID of FIG. 2 newly defined according to an exemplary embodiment of the present invention.

In an exemplary embodiment of the present invention, a new service ID structure that can use the OCAP specification of FIG. 4A without change is proposed. That is, the structure of the service ID of FIG. 4A is used without change and an area not defined yet (reserved area) in relation to the first byte of a service ID is used for generating an NSAP for an out-of-band.

In other words, in an exemplary embodiment of the present invention, when the first byte of a service ID is 03-FF, it is defined that the second and third bytes of the service ID indicate the program number of a service incoming through an out-of-band channel. In relation to a service incoming through an out-of-band channel, since no service information table (SIT) is formed for the service, there is no source ID in an NSAP. Accordingly, in order to execute the service incoming through an out-of-band channel, a terminal should directly obtain the program number, and therefore, as in the NSAP of FIGS. 3 and 4B, directly write a program number in the NSAP.

Figure 5:
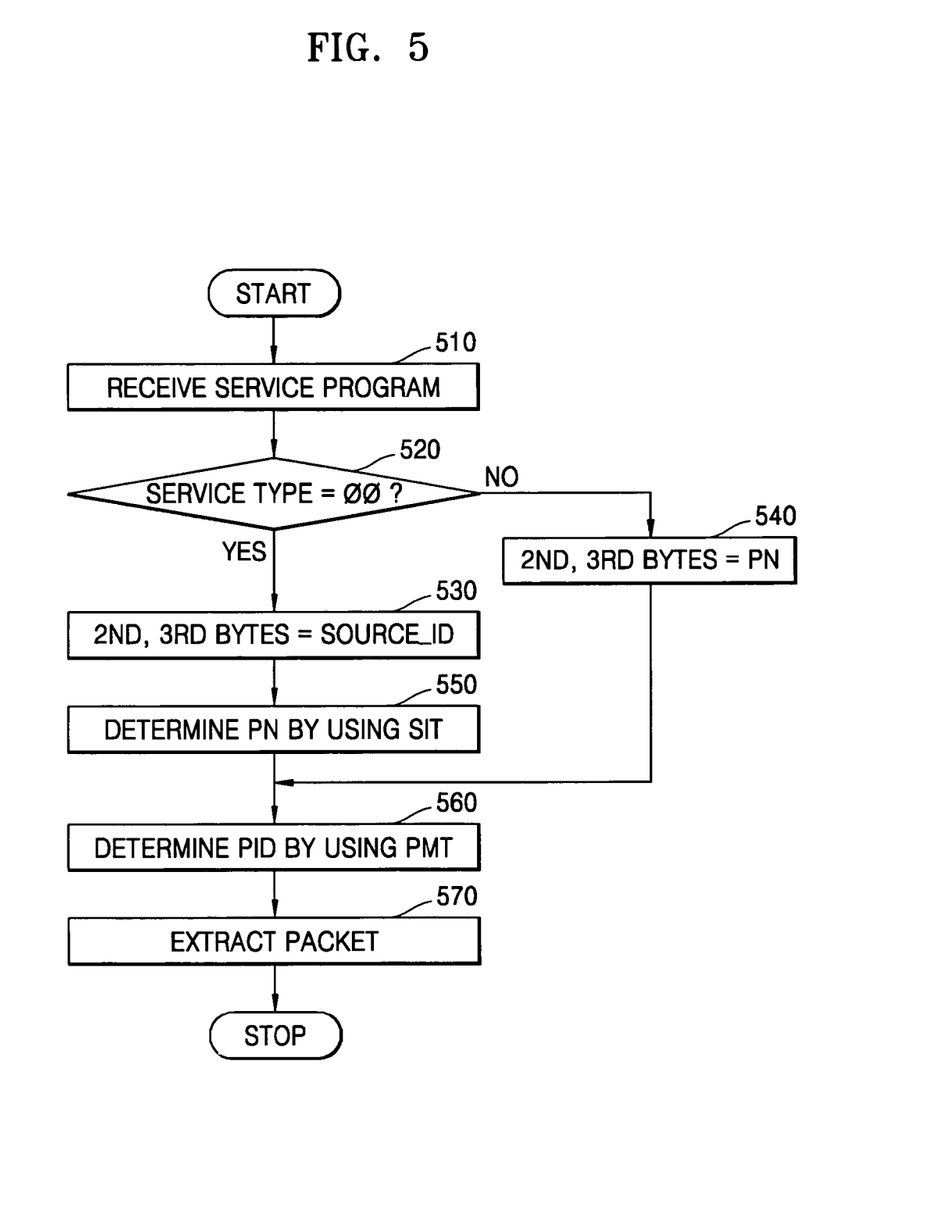
FIG. 5 is a flowchart of a method for receiving digital broadcasting data according to an exemplary embodiment of the present invention.

FIG. 5 is a flowchart of a method for receiving digital broadcasting data according to an exemplary embodiment of the present invention.

In operation 510, a receiver obtains service data from a transmission line. If the service data is a service program and it is indicated that this service program should refer to another service data, the service reference data should also be received.

In operation 520, by analyzing an NSAP existing in the service program obtained in the operation 510, the receiver extracts a service type, and by examining whether or not the service type (the first byte) is 00, determines whether the corresponding service reference data is transmitted through an in-band channel or an out-of-band channel.

If the service type is an in-band, operation 530 is performed, or else operation 540 is performed.

In operation 530, the receiver extracts the second and third bytes in the source ID area, as a source ID.

In operation 540, the receiver extracts the second and third bytes in the source ID area, as a program number.

In operation 550, by using a service information table (SIT), the receiver determines a program number (PN) corresponding to the source ID extracted in the operation 530. The SIT includes a table mapping a source ID and a program number (PN), and is transmitted in advance to a receiver by a broadcasting provider according to a predetermined protocol.

In operation 560, by using a program mapping table (PMT), the receiver determines a packet ID corresponding to the program number extracted in operations 540 and 550.

In operation 570, by extracting packets with the determined packet ID among all packets received by the receiver, the terminal selectively receives the corresponding packets.

The reception method of FIG. 5 has an advantage that the method can be applied to both service programs incoming through an in-band and an out-of-band. An example of service program A referring to service data B will now be explained. Service data B can be pure data or another service program.

In the conventional method, when service program A refers to service data B transmitted through an out-of-band, location information of service data B transmitted to a receiver through an out-of-band is not determined by a source ID. Accordingly, it is impossible for service program A to record location information of service data B in an NSAP. However, in the reception method according to the present invention, a new NSAP format that can be applied uniformly to both an in-band and an out-of-band is defined and a new reception method according to this is defined. By doing so, it is possible to record the location information of service data B incoming through an out-of-band, in service program A. This can be briefed as shown in table 1:

TABLE 1

| Service program A | Service data B | Whether referring to is possible | |
|---|---|---|---|
| | | Prior art | Present invention |
| IB | IB | Possible | Possible |
| OOB | | | |
| IB | OOB | Impossible | Possible |
| OOB | | | |

Figure 6:
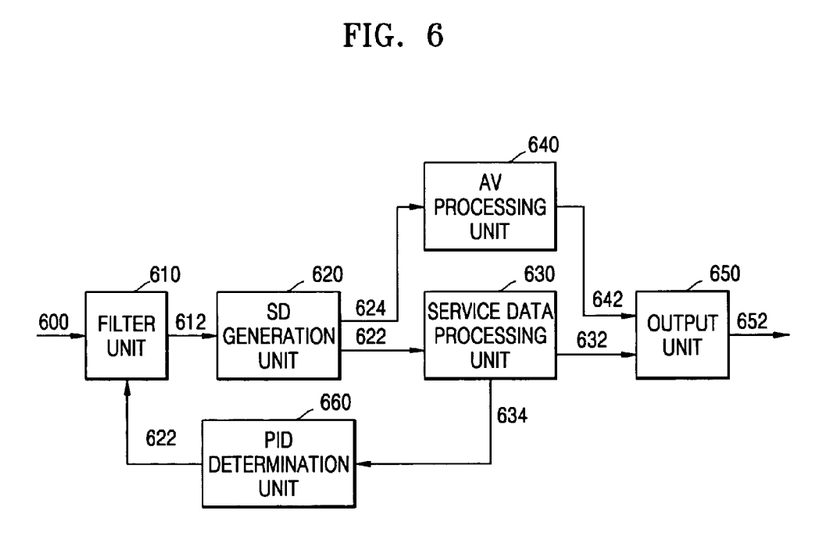
FIG. 6 is a diagram of a broadcast receiver according to an exemplary embodiment of the present invention.

FIG. 6 is a diagram of a broadcast receiver according to an exemplary embodiment of the present invention.

The broadcasting receiver according to an exemplary embodiment of the present invention includes a filter unit 610, a section data generation unit 620, a service data processing unit 630, an AV processing unit 640, an output unit 650, and a PID determination unit 660.

The filter unit 610 filters only packets indicating a program desired by a user among packets 600 received by the broadcasting receiver, based on a packet ID.

The section data generation unit 620 generates section data 622 and 644 that is a minimum unit of carousel data, by combining the filtered packets 612.

The service data processing unit 630 processes service data 622 in the section data, and generates service output data 632.

The AV processing unit 640 processes audio data and video data 624 in the section data, and generates AV output data 642.

The output unit 650 converts the service output data 632 and the AV output data 642 into data 652 that can be recognized by the user.

The PID determination unit 660 determines the packet ID 662 of a packet indicating another service data which is referred to by the service data 632 that is received and stored by the service data processing unit 630.

Figure 7:
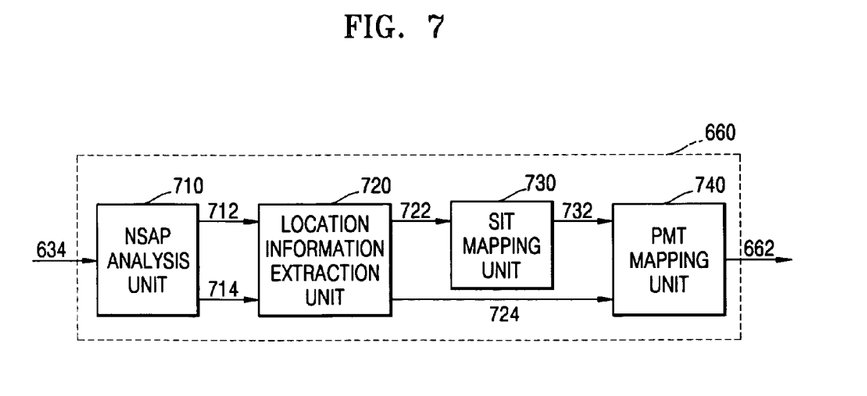
FIG. 7 is a diagram showing the internal structure of a packet ID (PID) determination unit.

FIG. 7 is a diagram showing the internal structure of the PID determination unit 660.

The PID determination unit 660 receives service data 634 from the service data processing unit 630, analyzes the service data, and by doing so, determines the packet ID of another service data that is referred to by the service data 634. For example, if service data processed first by the service data processing unit 630 is service program A, and service program A refers to another service program B, by analyzing an NSAP in service program A, the packet ID of service program B is determined.

The PID determination unit 660 includes an NSAP analysis unit 710, a location information extraction unit 720, an SIT mapping unit 730, and a PMT mapping unit 740.

The NSAP analysis unit 710 receives service data 634 from the service data processing unit 630, analyzes the NSAP in the service data 634, and by doing so, extracts the service type 712 and the service ID 714. The service type 712 is the first byte of the source ID and the service ID 714 is the second and third bytes of the source ID.

The location information extraction unit 720 generates the location information of reference data 722 and 724 based on the service type 712 and the service ID 714, and then transmits to the SIT mapping unit 730 or the PMT mapping unit 740.

First, if the service type 712 indicates an in-band, the location information extraction unit 720 determines the service ID 714 as the source ID 722 of an in-band, and transmits the source ID 722 to the SIT mapping unit 730. If the service type 712 indicates an out-of-band, the location information extraction unit 720 determines the service ID 714 as the program number 724 of an out-of-band, and transmits the program number 724 to the PMT mapping unit 740.

The SIT mapping unit 730 determines a program number 732 mapped to the source ID 722 by using a service information table (SIT). The SIT is provided to the broadcasting receiver by a broadcasting provider using an in-band channel.

The PMT mapping unit 740 determines the packet ID 662 mapped to the program number 732 and 724 by using a program mapping table (PMT). The PMT is provided to the broadcasting receiver by a broadcasting provider using an in-band channel or an out-of-band channel.

Figure 8:
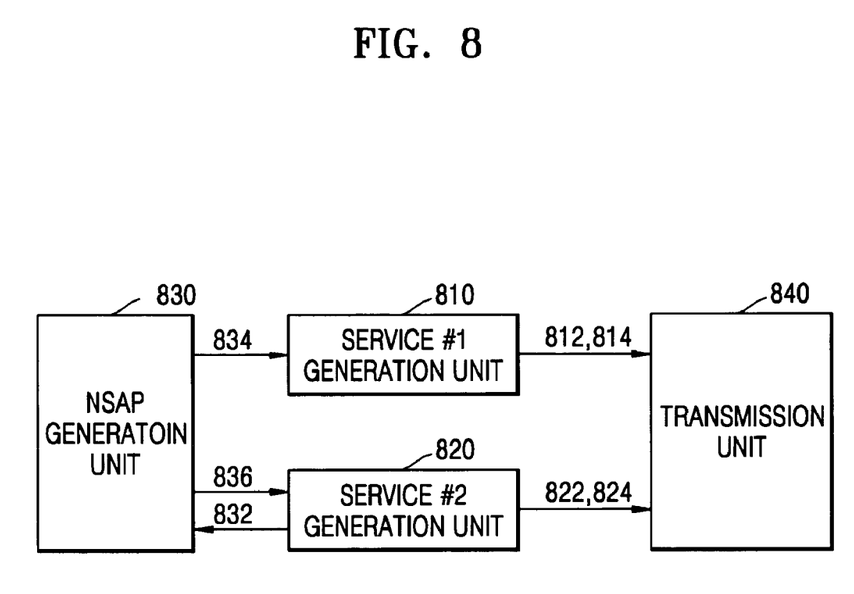
FIG. 8 is a diagram showing the internal structure of a transmitter which transmits service programs through an out-of-band channel by using the NSAP according to the present invention.

FIG. 8 is a diagram showing the internal structure of a transmitter which transmits service programs through an out-of-band channel by using the NSAP according to an exemplary embodiment of the present invention.

FIG. 8 shows a case where a first service program refers to a second service program transmitted through an out-of-band channel.

The transmitter according to an exemplary embodiment of the present invention includes a first service generation unit 810, a second service generation unit 820, an NSAP generation unit 830, and a transmission unit 840.

The first service generation unit 810 generates a first service program 812, and generates a first program mapping table 814 written based on the first service program code.

The second service generation unit 820 generates a second service program 822, and generates a second program mapping table 824 written based on the second service program code.

Since the second service program 822 is transmitted through an out-of-band, the second program mapping table 824 includes a program number, not a source ID, as location information on the second service program 822.

When the first service program 812 refers to the second service program 822, the second service generation unit 820 extracts the program number of the second service program from the second program mapping table 824, and then transmits to the NSAP generation unit 830.

The NSAP generation unit 830 generates the second program number transmitted by the second service generation unit 820, in the format of FIG. 3 in the NSAP of the first program, and by doing so, generates the NSAP 834 of the first program.

The transmission unit 840 receives the first service program 812, the first program mapping table 814, the second service program 822, and the second program mapping table 824 from the first and second service generation units 810 and 820, converts these into transport streams and then, transmits to the receiver.

Meanwhile, the method for receiving broadcasting data described above can be implemented as a computer program. Codes and code segments forming the program can be easily inferred by the programmers in the technology field of the present invention. Also, the program is stored in computer readable media, and read and executed by a computer to implement the method for receiving digital broadcasting. The computer readable media includes magnetic recording media and optical recording media.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method for receiving, at a receiver, digital broadcasting data comprising:
   at said receiver, extracting location information of second service data which already received first service data refers to, from the first service data;
   determining, by analyzing the location information, whether the second service data is one of in-band service data transmitted through an in-band channel and out-of-band service data transmitted through an out-of-band channel; and
   if the second service data is transmitted through the out-of-band channel, determining the location information as a program number of the second service data,
   wherein the location information includes a service type that is an identifier for identifying whether the second service data is at least the out-of-band service data,
   wherein the first service data includes a network service access point (NSAP) and the program number of the second service data is inserted into the NSAP of the first service data.

2. The method of claim 1, wherein when the service type is one particular type, the location information includes the source identification (ID) of the in-band channel as the location information of the second service data.

3. The method of claim 1, wherein when the service type is one particular type, the location information includes a program number of an out-of-band channel as the location information of the second service data.

4. The method of claim 1, further comprising:
   when the second service data is transmitted through the in-band channel, determining the location information as the source ID of the second service data.

5. The method of claim 4, further comprising:
   determining a program number corresponding to the source ID, based on a service information table (SIT) transmitted by a service provider of the in-band channel.

6. The method of claim 1, further comprising:
   determining a packet ID corresponding to the program number, based on a program mapping table (PMT) transmitted by a service provider of the out-of-band channel.

7. The method of claim 5, further comprising:
   determining a packet ID corresponding to the program number, based on a program mapping table (PMT) transmitted by the service provider of the in-band channel.

8. The method of claim 1, wherein the location information is identified using a network service access point.

9. An apparatus for receiving digital broadcasting data comprising:
   a service processing unit which processes first service data already received by the receiving apparatus, thereby generating service output data;
   a packet ID (PID) determination unit which determines a packet ID of second service data that is referred to by the first service data, based on location information in the first service data; and
   a filter unit which, by filtering packets received by the apparatus based on the packet ID, receives packets corresponding to the second service data,
   wherein the location information includes one of a source ID and a program number of the second service data according to whether the channel through which the second service data is transmitted is one of an in-band channel and an out-of-band channel,
   wherein the location information includes a service type that is an identifier for identifying whether the second service data is at least out-of-band service data,
   wherein the first service data includes a network service access point (NSAP) and the program number of the second service data is inserted into the NSAP of the first service data.

10. The apparatus of claim 9, wherein when the service type is one particular type, the location information includes the source ID of the in-band channel as the location information of the second service data.

11. The apparatus of claim 9, wherein when the service type is one particular type, the location information includes a program number of the out-of-band channel as the location information of the second service data.

12. The apparatus of claim 9, wherein the location information comprises:
   a service type that is an identifier for identifying whether the second service data is of one of the in-band service data and out-of-band service data; and
   the source ID when the service type indicates the in-band service data, and a service ID indicating a program number when the service type indicates the out-of-band service data.

13. The apparatus of claim 12, wherein the location information is identified using a network service access point (NSAP).

14. The apparatus of claim 13, wherein the PID determination unit comprises:
an NSAP analysis unit which, by analyzing the NSAP, extracts the service type and the service ID;
a location information extraction unit which, if the service type is one particular type, determines the service ID as the source ID, and if the service type is another type, determines that the service ID indicates a program number, thereby extracting one of the source ID and the program number of the second service data, as location information of the second service data;
an SIT mapping unit which, by using a predetermined service information table (SIT), determines a program number mapped into the source ID; and
a program mapping table (PMT) mapping unit which determines a packet ID corresponding to one of a program number extracted from the location information using a predetermined program mapping table (PMT), and a program number extracted from the SIT mapping unit.

15. An apparatus for transmitting first service data when first service data of digital broadcasting refers to second service data transmitted to an out-of-band channel, the apparatus comprising:
a first service generation unit which generates first program code of the first service data including a network service access point (NSAP), and based on the first program code of the first service data, generates a first program mapping table;
a second service generation unit which generates second program code of the second service data, and based on the second program code of the second service data, generates a second program mapping table including the a program number of the second service data;
an NSAP generation unit which, by inserting the program number of the second service data from the second service program into an NSAP of the first service data, generates the NSAP of the first service data; and
a transmission unit which transmits the first service data and the first service program mapping table.

16. A method of a transmitter for transmitting first service data when first service data of digital broadcasting refers to second service data transmitted to an out-of-band channel, the method comprising:
generating a first program code of the first service data including a network service access point (NSAP), and based on the first program code of the first service data, generating a first program mapping table;
generating a second program code of the second service data, and based on the program code of the second service data, generating a second program mapping table including a program number of the second service data;
generating the NSAP of the first service data by inserting the program number of the second service data from the second service program into the NSAP of the first service data; and
at said transmitter, transmitting the first service data and the first service program mapping table.

17. A non-transitory computer readable recording medium having embodied thereon a computer program for executing the method of claim 1.

\* \* \* \* \*